United States Patent [19]

F'Geppert

[11] Patent Number: 4,590,813
[45] Date of Patent: May 27, 1986

[54] INERTIA TRANSMISSION

[75] Inventor: Erwin F'Geppert, Oakland County, Mich.

[73] Assignee: The United States of America as represented by the Secretary of the Army, Washington, D.C.

[21] Appl. No.: 544,663

[22] Filed: Oct. 24, 1983

[51] Int. Cl.⁴ .................... F16H 33/02; F16H 33/08
[52] U.S. Cl. ...................... 74/64; 74/125.5; 74/114
[58] Field of Search ............ 74/126, 125.5, 128, 74/129, 55, 56, 64, 114

[56] References Cited

U.S. PATENT DOCUMENTS

| | | | |
|---|---|---|---|
| 1,974,108 | 9/1934 | Heinzelmann | 74/64 |
| 2,178,657 | 11/1939 | Travnicek | 74/64 |
| 2,232,234 | 2/1941 | Hilliard | 74/64 |
| 4,336,870 | 6/1982 | Shea | 74/64 |
| 4,498,357 | 2/1985 | Makarov | 74/64 |

Primary Examiner—Charles J. Myhre
Assistant Examiner—David A. Okonsky
Attorney, Agent, or Firm—John E. McRae; Robert P. Gibson; Peter A. Taucher

[57] ABSTRACT

A power transmission that uses inertia forces. The drive member carries a plurality of high density rollers that are acted on by centrifugal force. The driven member includes reaction surfaces that periodically move the high density rollers inwardly in opposition to the centrifugal force. As the rollers are moved inwardly they impart energy to the driven member, thereby producing a power transmission action. The reaction surfaces on the driven member are designed so that the system is responsive to speed and load changes.

10 Claims, 4 Drawing Figures

INERTIA TRANSMISSION

GOVERNMENT INTEREST

The invention described herein may be manufactured, used, and licensed by or for the Government for governmental purposes without payment to me of any royalty thereon.

BACKGROUND AND SUMMARY

This invention relates to a power transmission usable between a prime mover (e.g. an engine or motor) and a load to be powered (e.g. the wheels of a vehicle, a pump, or electric generator). One use of the invention is as an automatic transmission in automobiles or trucks.

Principal objects of the invention are to provide a transmission having the following general characteristics:

1. wide speed ratio change
2. no exterior controls
3. smooth speed ratio changes, no abrupt step-like changes
4. relatively compact, simplified design
5. positive-acting, not dependent on friction
6. load and speed responsive The invention contemplates an arrangement wherein a plurality of inertia elements (balls or rollers) are adapted to be slung centrifugally outwardly relative to the drive (input) shaft axis. A cam follower surface on a power-transmitting member is engaged with the inertia elements to receive the forces generated by the centrifugal action. In one specific embodiment the power-transmitting member is a reciprocating member having a stroke length inversely related to the load on the driven shaft. Reciprocation of the power-transmitting member is mechanically converted into rotational motion of the driven (output) shaft. Driven shaft speed is directly related to drive shaft speed and inversely related to load on the driven shaft.

THE DRAWINGS

FIG. 1 is taken on broken line 1—1 in FIG. 2.

Figure 1:
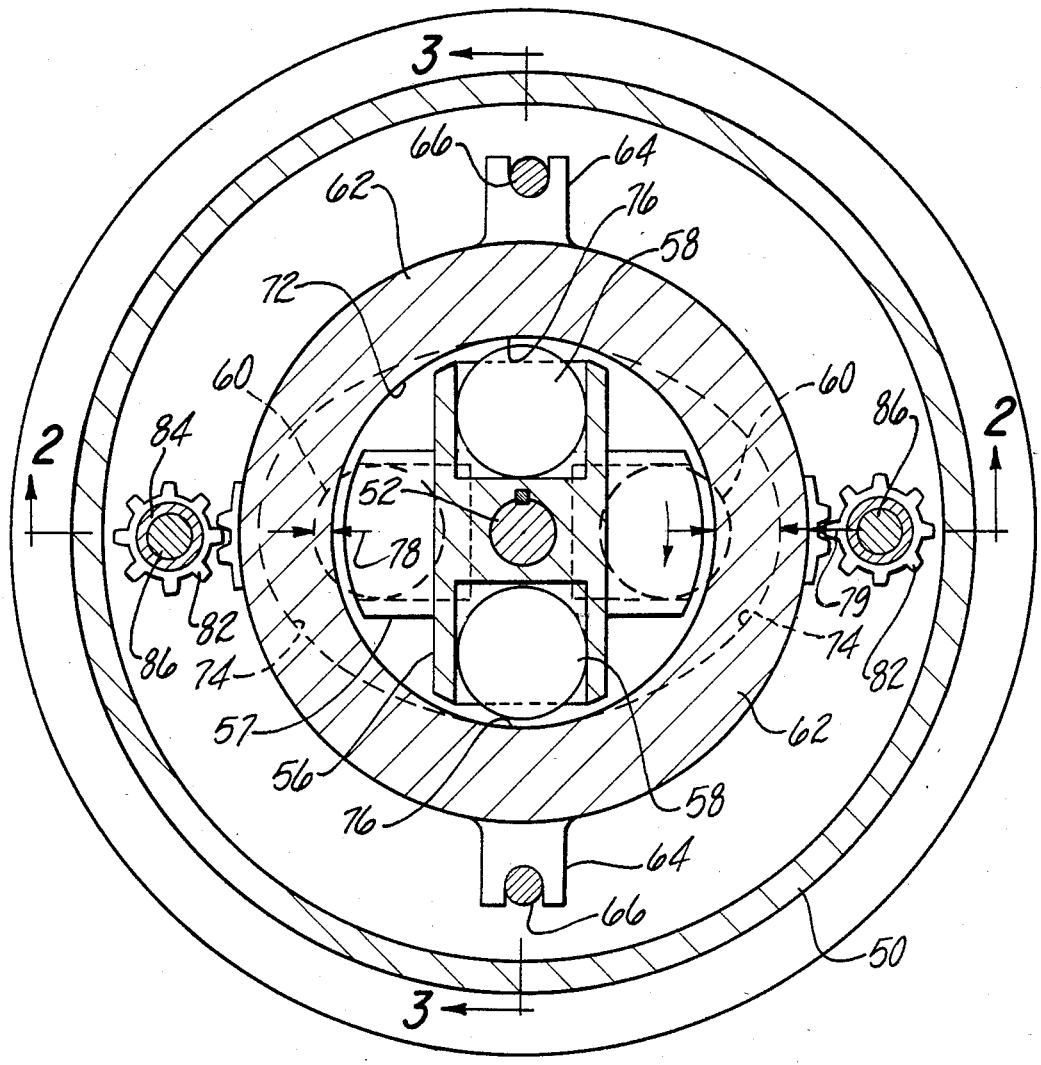
FIG. 1 is a transverse sectional view taken through a practical embodiment of the invention.
Figure 2:
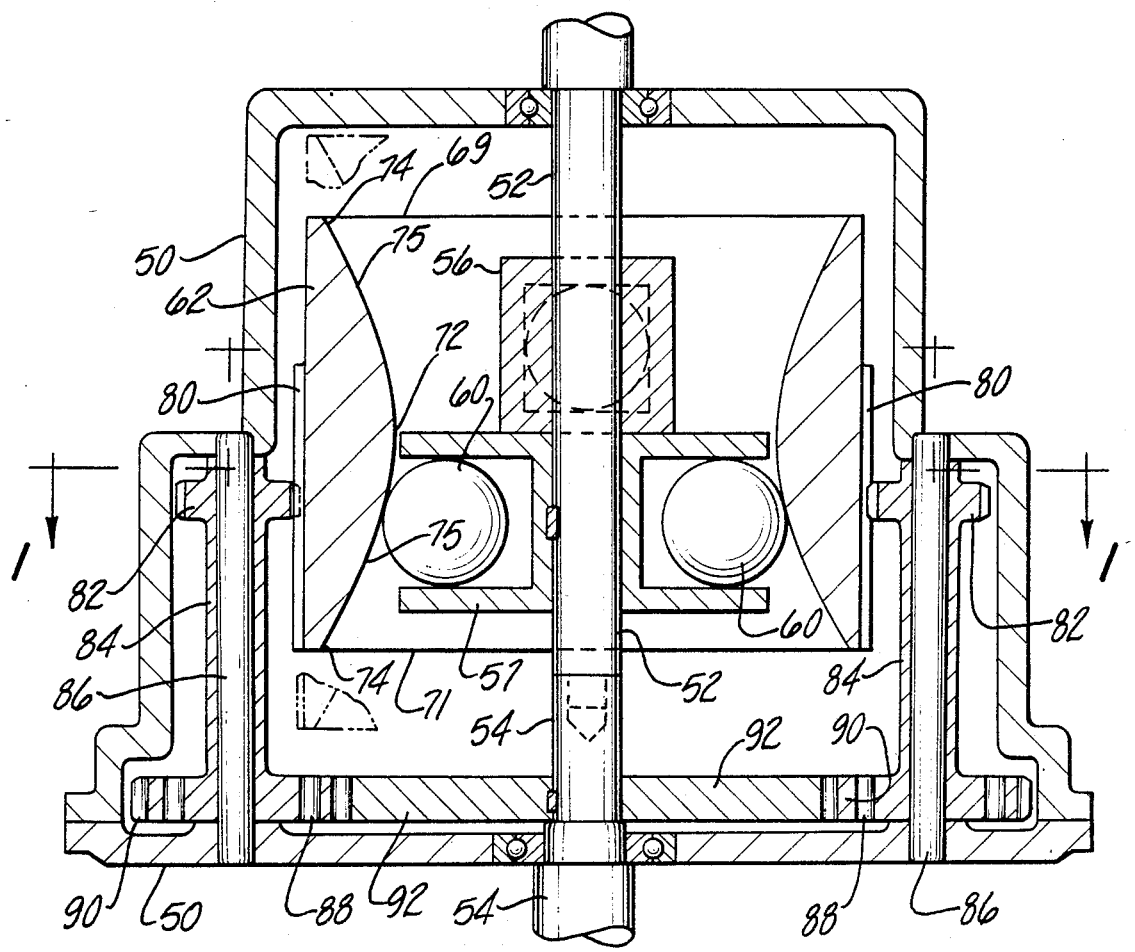
FIG. 2 is a sectional view taken on line 2—2 in FIG. 1.
Figure 3:
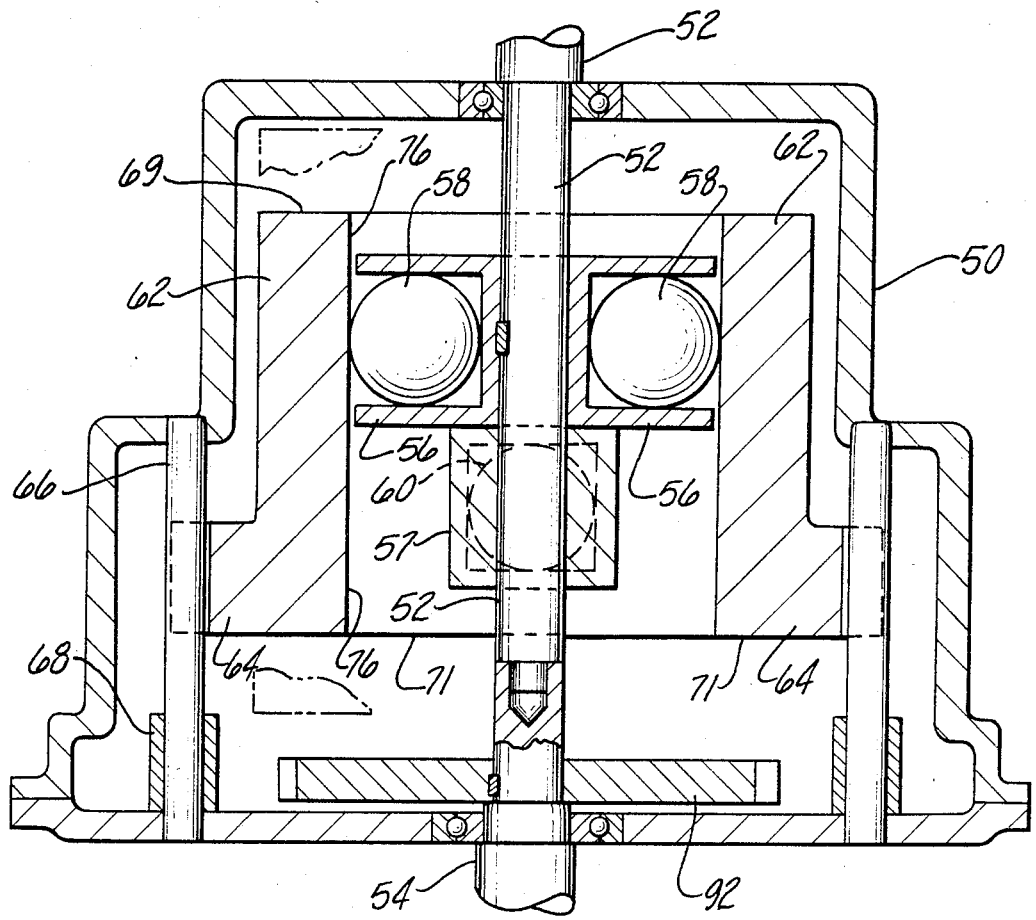
FIG. 3 is a sectional view taken on line 3—3 in FIG. 1.

Referring more particularly to FIGS. 1 through 3, there is shown a power transmission that includes a stationary housing 50 for supporting a rotary input shaft 52 and rotary output shaft 54. Input shaft 52 carries two hollow cage structures 56 and 57 arranged crosswise of one another. Each cage is of H-shaped cross-section for loosely supporting two diammetrically-spaced spherical inertia roller elements 58 or 60. Each spherical roller element is formed of a high density material, such as platinum or tungsten; alternatively it might be feasible to use hollow spherical elements of a relatively light material filled with a relatively heavy liquid such as mercury. Each spherical element is loosely positioned in its cage for radial motion toward or away from the rotational axis of drive shaft 52.

An annular force-transmitting member 62 circumscribes the space occupied by the spherical elements, such that when shaft 52 is rotated the spherical elements are slung by centrifugal action outwardly into pressure engagement with the inner surface of member 62; elements 58 and 60 have rolling contact with the inner surface of member 62. Member 62 can reciprocate along the shaft 52 axis but it cannot rotate. Thus, member 62 carries two diammetrically opposed arms 64 whose outer ends are grooved to slidably engage stationary guide posts 66. The dashed lines in FIGS. 2 and 3 indicate the upper and lower limits of member 62 reciprocation. Downward motion of member 62 is limited by engagement of arms 64 with the upper ends of stop collars 68 (FIG. 3) carried on posts 66; upward motion of member 62 is limited by engagement between arms 64 and the housing 50 interior surface.

The inner surface of annular member 62 is contoured to define two cam follower surfaces of similar contour; one surface may be considered the mirror image of the other. At the approximate midplane of member 62, i.e. midway between upper annular edge 69 and lower annular edge 71, the inner surface of member 62 is circular, as designated by numeral 72 in FIG. 1. At upper edge 69 (and at lower edge 71) the inner surface of member 62 is generally elliptical, as designated by numeral 74 in FIG. 1.

Figure 4:
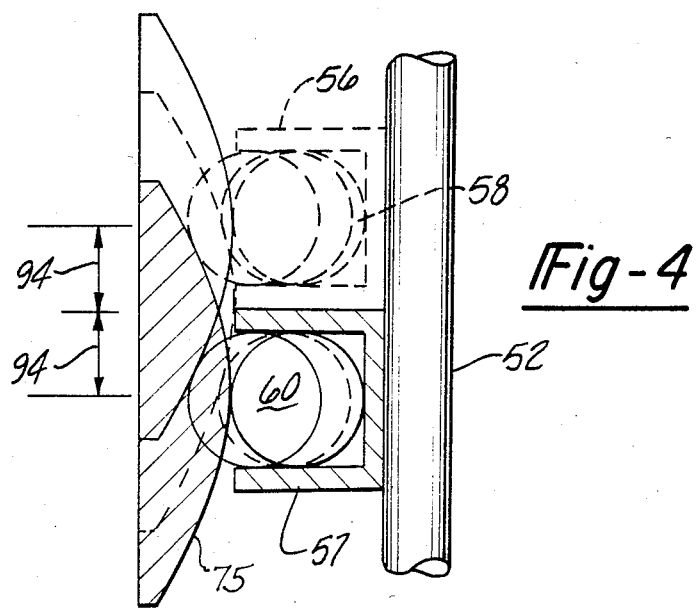
FIG. 4 is a fragmentary view illustrating the positions taken by certain components during operation of the FIG. 1 structure.

Line 75 in FIG. 4 illustrates the generally hourglass profile dimensional change in the major diameter of the ellipse from the midplane dimension at 72 to the upper (or lower) edge of member 62. The minor diameter of the ellipse corresponds to circular diameter 72 from upper edge 69 to lower edge 71. Thus, in FIG. 3 the profile of the cam follower surface appears as a straight line 76. If imaginary planes were struck through member 62 parallel to its midplane you would have elliptical surfaces of varying major diameter. The minor diameter of each ellipse would in each case correspond to diameter 72, whereas the major diameter would increase as you proceeded from the midplane of member 62 toward the upper (or lower) annular edge 69 (or 71). The surface contours are preferably as smooth as possible, without abrupt changes. The difference between circular diameter dimension 72 and the ellipse major diameter 74 represents the maximum permissible stroke of each inertia element 58 or 60. Under some conditions the inertia elements will have shorter stroke lengths. In general the inertia element stroke length will be relatively small for small reciprocations of member 62, and larger for greater reciprocation distances of member 62.

As shaft 52 rotates in a clockwise direction (FIG. 1) inertia roller elements 58 and 60 are centrifugally slung outwardly into pressure contact with the cam follower surface on member 62. As shown in FIG. 1, inertia elements 60 have minimum radial stroke displacements, identified by dimension 78. The maximum possible displacement is referenced by dimension 79. A quarter revolution of shaft 52 is required to displace each inertia element from its position nearest the shaft 52 axis to the position furthest away from the shaft 52 axis.

It can be visualized from FIG. 1 that during the next quarter revolution of shaft 52 from its illustrated position elements 60 will be forced radially inwardly toward the shaft 52 axis, whereas elements 58 will be slung centrifugally outwardly away from the shaft 52 axis. Elements 60 will be imparting inertia forces to the cam follower surfaces on member 62. Outward radial forces provided by elements 60 translate into an upward motion of annular member 62 (posts 66 prevent member 62 from rotating). The extent of such upward motion is related to the load (resistance) offered by member 62 to such motion.

When elements 58 are in the positions occupied by elements 60 (FIG. 1) the next quarter revolution of shaft 52 causes elements 58 to be forced radially inwardly, thereby imparting downward forces to member 62 (due to the fact that elements 58 and 60 operate in different planes, and the cam follower surface profiles slope in opposite directions). During each complete revolution of shaft 52 there will be two reciprocations of member 62 (two upstrokes and two downstrokes).

The peripheral edge of member 62 has two sets of helical teeth 80 thereon meshing with helical gears 82. Each gear is carried on a sleeve 84 that is freely rotatable on a fixed post 86. At its lower end each sleeve 84 mounts a one-way clutch 88 (e.g. a sprague clutch); the outer raceway of the clutch carries an external spur gear 90 that meshes with gear 92 suitably affixed to driven shaft 54. In operation of the system, upward movement of member 62 (or downward movement) produces rotary motions of helical gears 82. One of the sprague clutches 88 drives the associated gear 90 through a predetermined rotational distance, for thus producing an incremental rotational movement of gear 92 and shaft 54. The two sprague clutches are oriented to drive at alternate time periods. For example, the left-hand clutch could drive its gear 90 on the upstroke of member 62, whereas the right-hand clutch could drive its gear 90 on the downstroke of member 62.

The stroke distance of member 62 (up and down) is related to the load on driven shaft 54. High loads are fed back through the gear system as high resistances offered by gear 82 to motion of member 62. Under such high load conditions the spherical inertia elements 58 or 60 are unable to move member 62 through its full stroke, represented by numeral 94 in FIG. 6. At low loads inertia elements 58 and 60 are able to move member 62 through its full stroke. Speed of output shaft 54 is inversely related to the load.

Under start-up conditions, when the load is apt to be high, elements 58 and 60 will be near midplane 72, as shown in FIG. 2. Shaft 52 rotation will cause inertia elements 58 and 60 to traverse the cam follower surface; said elements will oscillate toward and away from the shaft 52 axis in accordance with the elliptical cam follower surface contour. Member 62 will reciprocate in an axial direction, thus driving output shaft 54 at a relatively low speed.

As shaft 54 accelerates the resistance offered by member 62 lessens; elements 58 and 60 are enabled to move member 62 greater distances during inward oscillations of the respective inertia elements. At the same time elements 58 and 60 are able to move further distances away from the shaft 52 axis in accordance with changes in the ellipse major diameter (contour 75 in FIG. 2); the increased radial motion of elements 58,60 produces greater centrifugal force, which further increases the reciprocation rate of member 62. In general, the speed of output shaft 54 is inversely related to the load on shaft 54 and directly related to the speed of input shaft 52.

I wish it to be understood that I do not desire to be limited to the exact details of construction shown and described for obvious modifications will occur to a person skilled in the art, without departing from the spirit and scope of the appended claims.

I claim:

1. A power transmission comprising a rotary drive member (52); a rotary driven member (54,92); an annular cam follower member (62) surrounding the drive member; means (66) confining the cam follower member to reciprocatory motion along the drive member rotational axis; radially-movable inertia rollers (58,60) of high density material carried by the drive member in pressure engagement with the cam follower member to translate drive member rotation into cam follower member reciprocation; and one-way drive means (88) operatively disposed between the cam follower member and rotary driven member, whereby said driven member is driven rotationally;

said annular cam follower member defining a series of endless cam follower surfaces occupying parallel planes normal to the drive member rotational axis; each said cam follower surface comprising first surface sections located relatively close to the drive member rotational axis and second surface sections located relatively remote from the drive member rotational axis, said first surface sections transitioning smoothly into said second surface sections to form an endless cam follower surface operable to oscillate the associated rollers radially toward and away from the drive member axis;

the second surface section in some of the endless cam follower surfaces being spaced further away from the drive member rotational axis than the second surface sections in other ones of the endless cam follower surfaces to vary the roller oscillation stroke in accordance with positional changes of the annular member.

2. The transmission of claim 1 wherein the inertia rollers are spherical.

3. The transmission of claim 1 wherein said second surface sections collectively give the cam follower member an hourglass profile in an axial plane taken through the second surface sections.

4. The transmission of claim 3 wherein said hourglass profile is symmetrical relative to a radial plane taken midway between opposite ends of the cam follower member.

5. The transmission of claim 4 wherein said inertia rollers consist of two sets of inertia rollers occupying different radial planes normal to the drive member rotational axis.

6. The transmission of claim 5 wherein each set of inertia rollers consists of two rollers arranged on a diammetrical line passing through the drive member rotational axis.

7. The transmission of claim 6 wherein the cam follower surfaces are oriented to the inertia rollers so that the inertia rollers in one set are moving radially away from the drive member rotational axis while the inertia rollers in the other set are moving radially toward the drive member rotational axis, and vice versa.

8. The transmission of claim 7 wherein the individual cam follower surfaces have elliptical contours viewed in planes normal to the drive member rotational axis.

9. The transmission of claim 8 wherein the ellipse major axis dimension progressively changes when measured along the drive member axis, to thereby define the aforementioned hourglass profile; the ellipse minor axis dimension being constant when measured along the drive member axis.

10. The transmission of claim 9 wherein the two sets of inertia rollers are axially displaced from one another so that the different sets of rollers engage the cam follower member on opposite sides of the aforementioned radial plane taken midway between opposite ends of the cam follower member.

* * * * *